(12) United States Patent
Wallman

(10) Patent No.: US 9,348,931 B2
(45) Date of Patent: May 24, 2016

(54) INTEGRATION OF WEB INFORMATION ARCHITECTURE TAXONOMY AND WEB METRICS TAXONOMY

(75) Inventor: Tracy H. Wallman, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1266 days.

(21) Appl. No.: 12/647,781

(22) Filed: Dec. 28, 2009

(65) Prior Publication Data

US 2011/0161312 A1   Jun. 30, 2011

(51) Int. Cl.
*G06F 7/00* (2006.01)
*G06F 17/30* (2006.01)

(52) U.S. Cl.
CPC .................. *G06F 17/3089* (2013.01)

(58) Field of Classification Search
CPC ................................. G06F 17/3089
USPC .......................... 707/722, 999.001
See application file for complete search history.

(56) References Cited

U.S. PATENT DOCUMENTS

| | | | |
|---|---|---|---|
| 6,925,631 B2 | 8/2005 | Golden | |
| 7,353,272 B2 | 4/2008 | Robertson et al. | |
| 7,765,295 B2 * | 7/2010 | Anastas et al. | 709/224 |
| 8,065,410 B1 * | 11/2011 | Breen et al. | 709/224 |
| 8,126,962 B1 * | 2/2012 | Schnedler et al. | 709/203 |
| 2002/0184263 A1 | 12/2002 | Perinet et al. | |
| 2003/0018626 A1 * | 1/2003 | Kay et al. | 707/3 |
| 2003/0084120 A1 | 5/2003 | Egli | |
| 2006/0277212 A1 * | 12/2006 | Error | 707/102 |
| 2007/0100829 A1 * | 5/2007 | Allen et al. | 707/9 |
| 2007/0266145 A1 * | 11/2007 | Nesbitt et al. | 709/224 |
| 2008/0071766 A1 * | 3/2008 | Grieselhuber et al. | 707/5 |
| 2008/0114875 A1 * | 5/2008 | Anastas et al. | 709/224 |
| 2009/0327336 A1 * | 12/2009 | King et al. | 707/103 R |
| 2011/0093461 A1 * | 4/2011 | Mui et al. | 707/736 |
| 2011/0153796 A1 * | 6/2011 | Branson | 709/223 |

OTHER PUBLICATIONS

"Improving Source Content Quality for Global Audiences", Prepared for the STC 2008 Technical Communications Summit, Jun. 2008, 22 pages.

* cited by examiner

*Primary Examiner* — Kimberly Wilson
(74) *Attorney, Agent, or Firm* — Stephen R. Ticals; Stephen J. Walder, Jr.; Parashos Kalaitzis

(57) ABSTRACT

Mechanisms are provided for integration of Web information architecture taxonomy and Web metrics taxonomy. When the author creates source content, the mechanism classifies the content using a rich taxonomy. The mechanism also adds unique identifiers into the source content pages as tags. The mechanism may then transform the source content into Web content that contains the identifiers in the tags. When users view the Web content, the tags generate usage data, which contain the identifiers. A Web metrics mechanism generates a Web metrics report from the usage data. The page tags are the identifiers from the source content. The Web metrics report associates each page of Web content with the rich taxonomy available in the source content.

15 Claims, 5 Drawing Sheets

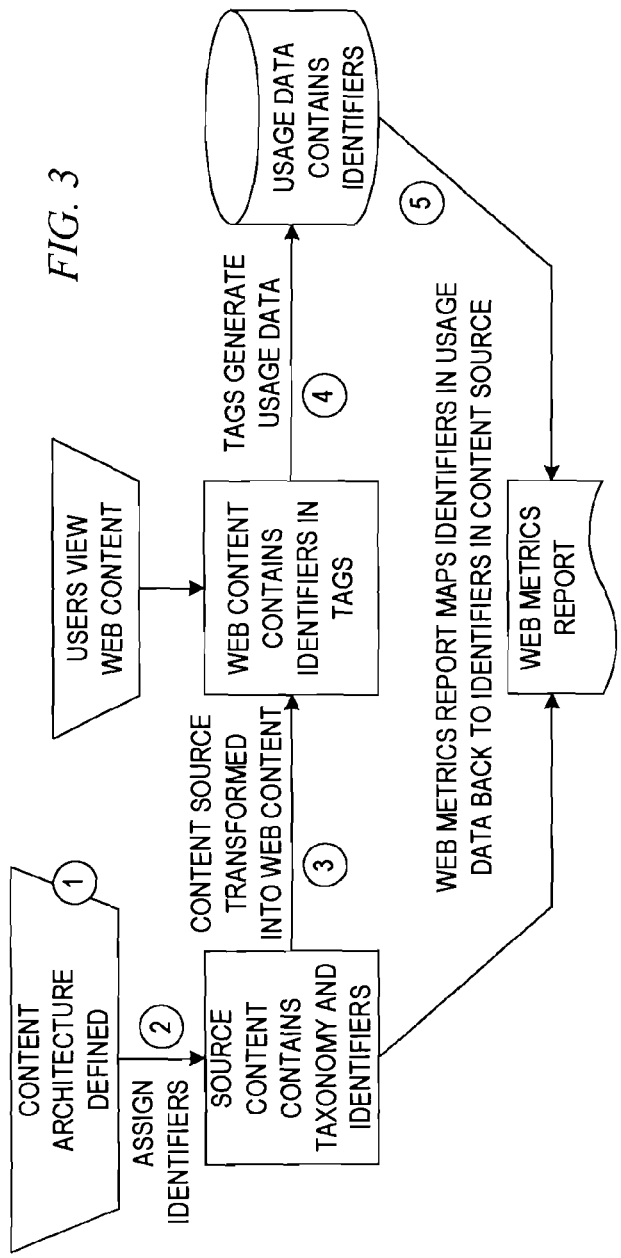

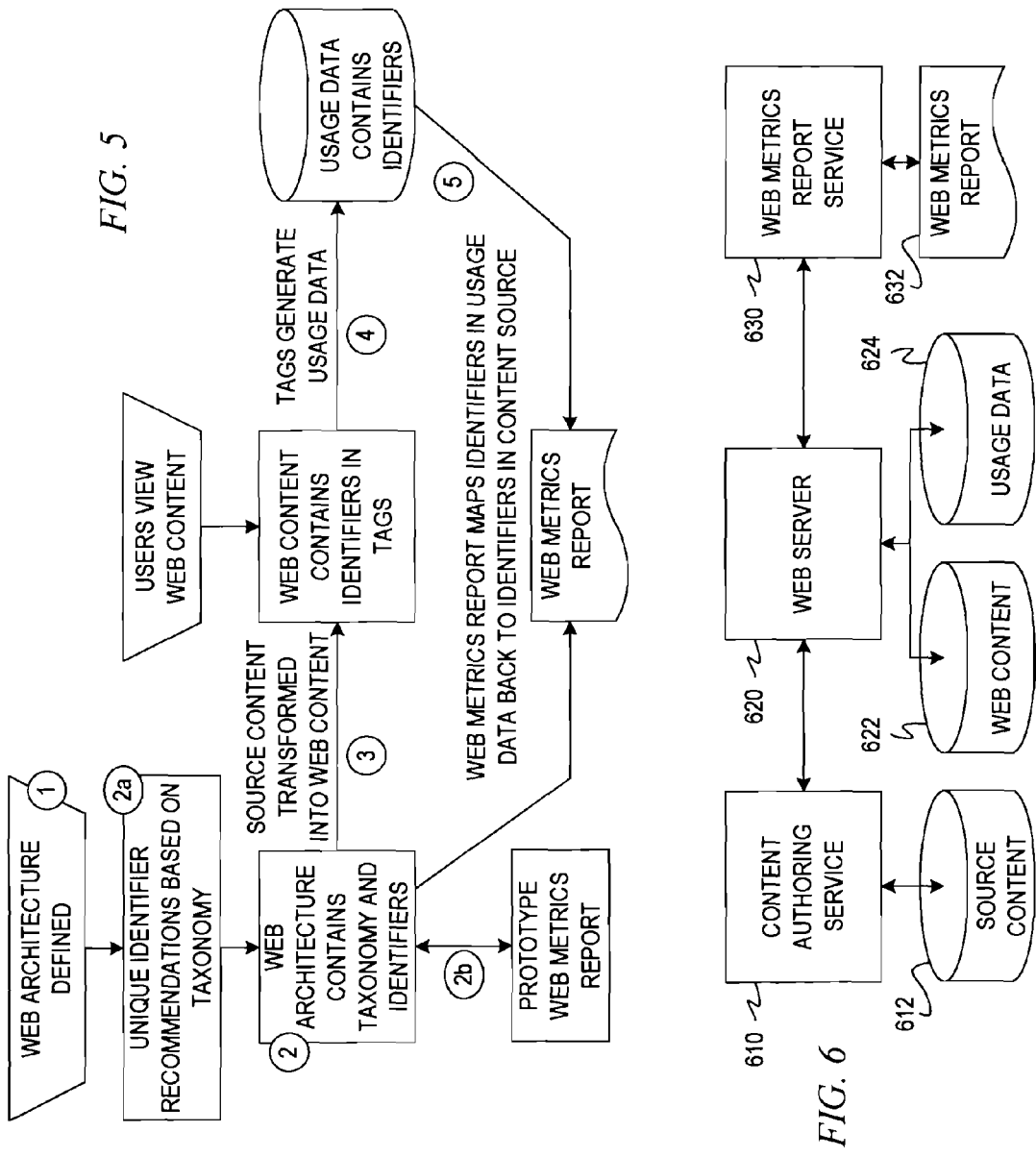

FIG. 7

| Group | Product | Platform | Topic | Module | Type | Format | Views | Users | Internal |
|---|---|---|---|---|---|---|---|---|---|
| All groups | All Products | All Platforms | All topics | All modules | All Types | All formats | 130708 | 23637 | 4566 |
| AIM | All Products | All Platforms | All topics | All modules | All Types | All formats | 82819 | 14004 | 2891 |
| AIM | WebSphere Application Server for z/OS | All Platforms | All topics | All modules | All Types | All formats | 3181 | 1069 | 142 |
| AIM | WebSphere Application Server for z/OS | z/OS | All topics | All modules | All Types | All formats | 3181 | 1069 | 142 |
| AIM | WebSphere Application Server for z/OS | z/OS | All topics | All modules | All Types | All formats | 2300 | 900 | 122 |
| AIM | WebSphere Application Server for z/OS | z/OS | Problem determination | All modules | All Types | All formats | 753 | 340 | 45 |
| AIM | WebSphere Application Server for z/OS | z/OS | Problem determination | Setting trace | All Types | All formats | 1 | 1 | 0 |
| AIM | WebSphere Application Server for z/OS | z/OS | Problem determination | Setting trace | Demo | All formats | 1 | 1 | 0 |
| AIM | WebSphere Application Server for z/OS | z/OS | Problem determination | Setting trace | Demo | sfw | 1 | 1 | 0 |
| AIM | WebSphere Application Server for z/OS | z/OS | Problem determination | Overview - where to start | All Types | All formats | 53 | 33 | 2 |
| AIM | WebSphere Application Server for z/OS | z/OS | Problem determination | Overview - where to start | Presentation | All formats | 53 | 33 | 2 |
| AIM | WebSphere Application Server for z/OS | z/OS | Problem determination | Overview - where to start | Presentation | sfw | 43 | 26 | 1 |
| AIM | WebSphere Application Server for z/OS | z/OS | Problem determination | Overview - where to start | Presentation | pdf | 10 | 9 | 1 |

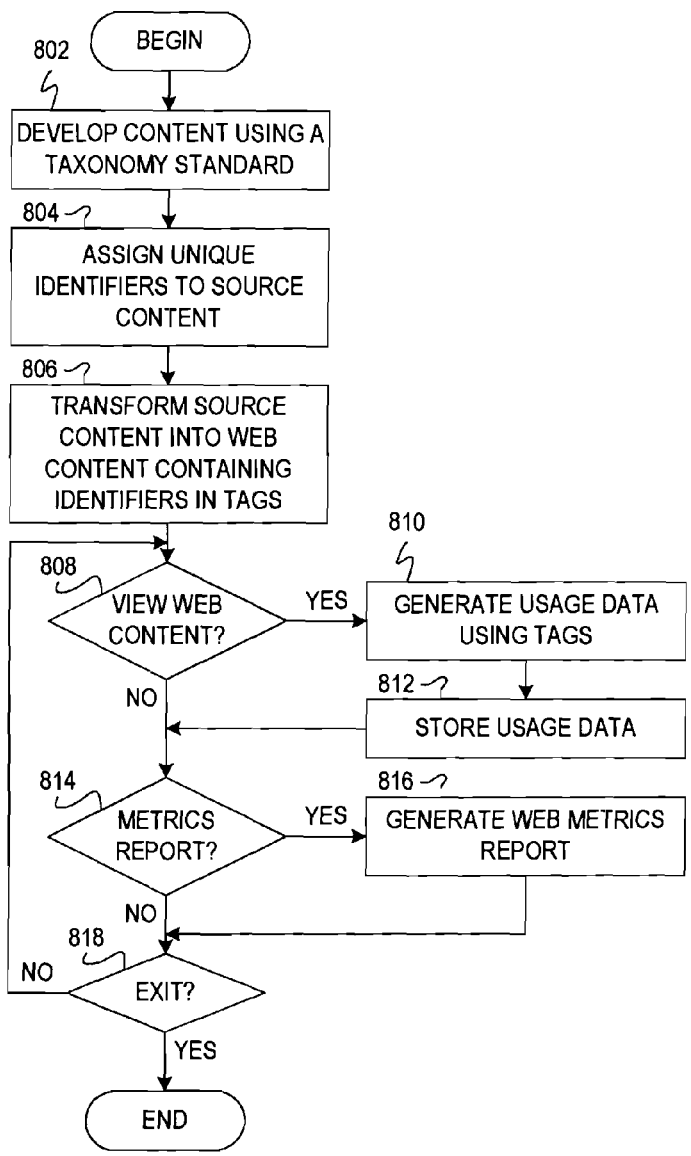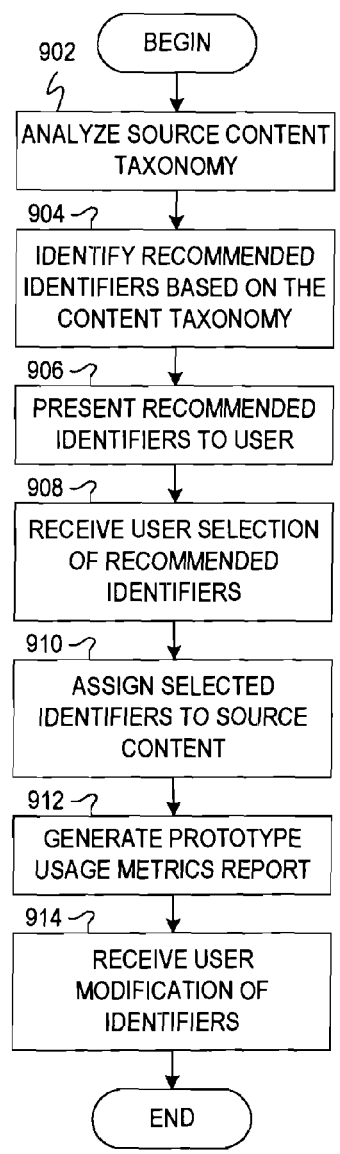

INTEGRATION OF WEB INFORMATION ARCHITECTURE TAXONOMY AND WEB METRICS TAXONOMY

BACKGROUND

The present application relates generally to an improved data processing apparatus and method and more specifically to mechanisms for integration of Web information architecture taxonomy and Web metrics taxonomy.

Available Web metrics applications are Web centric, meaning they measure how many times a given Web page is viewed. These page views, or "hits," are compared to various factors, such as the geography of the viewers or what Web page the user took to reach the viewed Web page. However, the organization of Web metrics is, for the most part, fixed by what information is in the Web server logs. Thus, Web metrics is centered around measuring a number of hits per Web page.

Standards exist for defining architectures for designing, writing, managing, and publishing many kinds of information in print and on the Web. For example, Darwin Information Typing Architecture (DITA) is an extensible markup language (XML) based architecture for authoring, producing, and delivering information. Although its main applications have so far been in technical publications, DITA is also used for other types of documents such as policies and procedures. Other such standards include standard generalized markup language (SGML) and DocBook. SGML is a standard technology for defining generalized markup languages for documents. DocBook is a semantic markup language for technical documentation. DocBook was originally intended for writing technical documents related to computer hardware and software; however, DocBook can be used for other types of documentation. All these existing standards for defining architectures enable users to create content in a presentation-neutral form that captures the logical structure of the content, which can then be published in a variety of formats, including HTML, XHTML, EPUB, PDF, and the like, without requiring users to make any changes to the source.

SUMMARY

In one illustrative embodiment, a method, in a data processing system, is provided for integrating source content taxonomy and Web metrics taxonomy. The method may comprise developing source content using a source content taxonomy, assigning one or more unique identifiers to the source content based on the source content taxonomy, and transforming the source content into Web content. The Web content contains the one or more unique identifiers in tags. Responsive to users accessing the Web content from a Web server, the method may comprise generating usage data based on the tags. The usage data contains the one or more unique identifiers. The method may further comprise generating a Web metrics report based on the usage data, wherein the Web metrics report maps items of the Web content to the source content taxonomy based on the one or more unique identifiers.

In other illustrative embodiments, a computer program product comprising a computer useable or readable medium having a computer readable program is provided. The computer readable program, when executed on a computing device, causes the computing device to perform various ones, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 3 is a block diagram illustrating integration of Web information architecture taxonomy and Web metrics taxonomy in accordance with an illustrative embodiment;

FIGS. 4A-4C illustrate techniques for collecting usage data using tags in accordance with illustrative embodiments;

FIG. 5 is a block diagram illustrating integration of Web information architecture taxonomy and Web metrics taxonomy with automated classification assistance in accordance with an illustrative embodiment;

FIG. 6 is a block diagram illustrating a system for integration of Web information architecture taxonomy and Web metrics taxonomy in accordance with an illustrative embodiment;

FIG. 7 depicts a partial view of an example Web metrics report in accordance with an illustrative embodiment;

FIG. 8 is a flowchart illustrating operation of a system for integration of Web information architecture taxonomy and Web metrics taxonomy in accordance with an illustrative embodiment; and FIG. 9 is a flowchart illustrating operation of a system for integration of Web information architecture taxonomy and Web metrics taxonomy with automated classification assistance in accordance with an illustrative embodiment.

DETAILED DESCRIPTION

The illustrative embodiments provide a mechanism for integration of Web information architecture taxonomy and Web metrics taxonomy. When the author creates source content, the mechanism classifies the content using a rich taxonomy. The mechanism also adds unique identifiers into the source content pages as tags. The mechanism may then transform the source content into Web content that contains the identifiers in the tags. When users view the Web content, the tags generate usage data, which contain the identifiers. A Web metrics mechanism generates a Web metrics report from the usage data. According to the illustrative embodiments, the page tags are the identifiers from the source content. That is, the page tag data may be mapped back to the source content taxonomy. The effect is a Web metrics report that associates each page of Web content with the rich taxonomy available in the source content.

Figure 1:
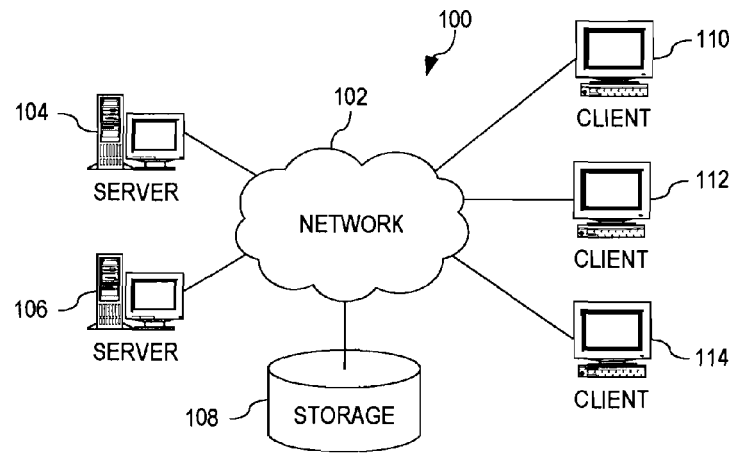
FIG. 1 depicts a pictorial representation of an example distributed data processing system in which aspects of the illustrative embodiments may be implemented.
Figure 2:
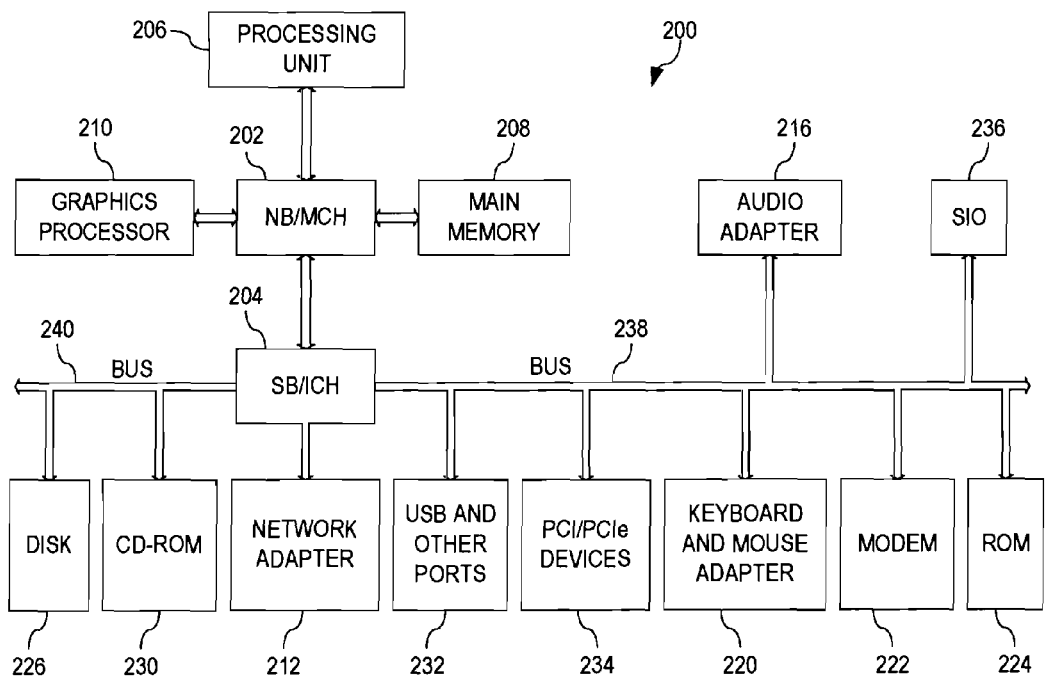
FIG. 2 is a block diagram of an example data processing system in which aspects of the illustrative embodiments may be implemented.

Thus, the illustrative embodiments may be utilized in many different types of data processing environments including a distributed data processing environment, a single data processing device, or the like. In order to provide a context for the description of the specific elements and functionality of the illustrative embodiments, FIGS. 1 and 2 are provided hereafter as example environments in which aspects of the illustrative embodiments may be implemented. While the description following FIGS. 1 and 2 will focus primarily on a single data processing device implementation, this is only an example and is not intended to state or imply any limitation with regard to the features of the present invention. To the contrary, the illustrative embodiments are intended to include distributed data processing environments and embodiments in which a Web metrics mechanism generates Web metrics reports for Web content that is generated from source content having a rich taxonomy.

With reference now to the figures and in particular with reference to FIGS. 1 and 2, example diagrams of data processing environments are provided in which illustrative embodiments of the present invention may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In accordance with an illustrative embodiment, server 104 may provide a content authoring service, which may use a standard, such as DITA, SGML, or DocBook. An author may access the content authoring service using a client, such as client 110, for example. The content authoring service may store the source content in storage 108, for example.

Server 106 may provide a Web server application. The content authoring service may transform the source content into Web content, which may be published to the Web using the Web server application. The Web server application may access the Web content from storage 108, for example, or another storage device (not shown).

Users at clients 112, 114, for example, may access the Web content, and the Web server application may generate usage data. The Web server application may store the usage data at storage 108, for example, or another storage device (not shown). Server 104 or server 106, or another server data processing system (not shown), may provide a Web metrics report service that generates a Web metrics report based on the usage data.

In accordance with the illustrative embodiment, the content authoring service may classify the content using a rich taxonomy and add unique identifiers into the source content pages as tags. The content authoring service may then transform the source content into Web content that contains the identifiers in the tags. When the users view the Web content, the tags generate usage data, which contain the identifiers. The Web metrics report service generates the Web metrics report from the usage data. According to the illustrative embodiment, the page tags are the identifiers from the source content. That is, the page tag data may be mapped back to the source content taxonomy. The effect is a Web metrics report that associates each page of Web content with the rich taxonomy available in the source content.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

With reference now to FIG. 2, a block diagram of an example data processing system is shown in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM® eServer™ System p® computer system, running the Advanced Interactive Executive (AIX®) operating system or the LINUX® operating system (eServer, System p, and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device which is configured with flash memory to provide non-volatile memory for storing operating system files and/or user-generated data, for example. Essentially, data processing system 200 may be any known or later developed data processing system without architectural limitation.

FIG. 3 is a block diagram illustrating integration of Web information architecture taxonomy and Web metrics taxonomy in accordance with an illustrative embodiment. The author defines a Web architecture using a content authoring service for example (step 1). When developing Web content using a rich source content architecture, such as DITA, SGML, or DocBook, for example, the author may classify each item of content in one of many possible taxonomy classifications. For example, a software company may classify content by product name, product version, platform, features, target audience, keywords, etc. The author may also use complex content organization systems using subject relationships, classification relationships, and topic relationships.

The author, using a content authoring service for example, may assign unique identifiers to the source content using the source content taxonomy and content organization systems (step 2). The source content taxonomy may include an identifier attribute for many elements, and the author may define a custom attribute.

The content authoring service then transforms the source content, which contains the unique identifiers, into Web content containing the identifiers in tags (step 3). A simple method is to transform each source content taxonomy element into an item of Web content assigned its own unique identifier. The identifier may be unique over the scope of all content to be measured. The unique identifier may be embedded into the Web content in the form of a tag. The content authoring service may transform the source content into static Web content, or the source content may be the source for a Web application that generates Web content dynamically. The effect is the same as long as a tag with the identifier is embedded into the Web content.

As users view the Web content, the tags generate usage data (step 4). The usage data may be collected by various techniques. The identifiers may be stored in the Web server log, the log of a separate Web server, or a separate database. Whatever data storage technique is used, the identifiers from the tags are stored in the usage data. The original source content contains the taxonomy and the identifiers for each item of Web content. The usage data contains the identifiers of what Web content items (i.e. pages) were viewed and when. In accordance with the illustrative embodiment, a Web metrics report program maps the identifiers from the source content to the identifiers from the usage data (step 5). The result is a Web metrics report that shows Web metrics using the same taxonomy as the information architecture.

FIGS. 4A-4C illustrate techniques for collecting usage data using tags in accordance with illustrative embodiments. FIG. 4A illustrates a structure that uses the identifier as a parameter to a JavaScript function or an invisible image file. FIG. 4B illustrates a structure defining a non-HTML item of content using JavaScript on the link to the item. FIG. 4C illustrates a structure placing the identifier in the uniform resource locator (URL) of the item itself as a parameter. The mechanisms of the illustrative embodiments may use any of the tag data collection techniques shown in FIGS. 4A-4C, or combinations of these techniques.

FIG. 5 is a block diagram illustrating integration of Web information architecture taxonomy and Web metrics taxonomy with automated classification assistance in accordance with an illustrative embodiment. The author defines a Web architecture using a content authoring service for example (step 1). The author, using the content authoring service for example, may assign unique identifiers to the source content using the source content taxonomy and content organization systems (step 2). The source content taxonomy may include an identifier attribute for many elements, and the author may define a custom attribute.

More particularly, the content authoring service analyzes the taxonomy of the Web architecture and provides recommendations for the placement of unique identifiers (step 2*a*). With this feedback, the author defining the Web architecture taxonomy may make adjustments to the taxonomy and accept recommended unique identifiers if needed. This act of pre-processing improves the quality of the Web architecture before it is converted into Web content. The content authoring service may then generate a prototype Web metrics report (step 2*b*). With this feedback, the author may make adjustments to the taxonomy or assign new unique identifiers if needed. This technique emphasizes the usage metrics taxonomy up-front, making it clear that it is one and the same with the Web architecture taxonomy. Thus, if an author already has defined the taxonomy of the Web architecture, the author may have different ideas once he sees the taxonomy in the context of the usage metrics report. Using this technique, the author will be less likely to have changes to the taxonomy later after the Web content is created.

The content authoring service then transforms the source content, which contains the unique identifiers, into Web content containing the identifiers in tags (step 3). A simple method is to transform each source content taxonomy element into an item of Web content assigned its own unique identifier. The identifier may be unique over the scope of all content to be measured. The unique identifier may be embedded into the Web content in the form of a tag. The content authoring service may transform the source content into static Web content, or the source content may be the source for a Web application that generates Web content dynamically. The effect is the same as long as a tag with the identifier is embedded into the Web content.

As users view the Web content, the tags generate usage data (step 4). The usage data may be collected by various techniques. The identifiers may be stored in the Web server log, the log of a separate Web server, or a separate database. Whatever data storage technique is used, the identifiers from the tags are stored in the usage data. The original source content contains the taxonomy and the identifiers for each item of Web content. The usage data contains the identifiers of what Web content items (i.e. pages) were viewed and when. In accordance with the illustrative embodiment, a Web metrics report program maps the identifiers from the source content to the identifiers from the usage data (step 5). The result is a Web metrics report that shows Web metrics using the same taxonomy as the information architecture.

FIG. 6 is a block diagram illustrating a system for integration of Web information architecture taxonomy and Web metrics taxonomy in accordance with an illustrative embodiment. Content authoring service 610 provides a mechanism for an author to define a content architecture and to assign identifiers to items in the taxonomy. The author uses content authoring service 610 to create source content 612, which contains the content architecture taxonomy and unique identifiers for items of content based on the source content taxonomy and content organization systems.

Content authoring service 610 transforms source content 612 into Web content 622. Web server 620 provides access to web content 622, which contains the identifiers as tags. As users access Web content 622, Web server 620 generates usage data 624, which contains the identifiers.

Web metrics report service 630 generates Web metrics report 632 using usage data 624. Usage data 624 contains identifiers of what Web content items were viewed and when. Web metrics report 632 maps the identifiers from source content 612 to identifiers from usage data 624. Thus, Web metrics report 632 shows Web metrics using the same taxonomy as the information architecture generated using content authoring service 610.

FIG. 7 depicts an example Web metrics report in accordance with an illustrative embodiment. As shown in FIG. 7, the Web metrics report does not simply show pages and numbers of views. Rather, the Web metrics report depicted in FIG. 7 shows usage data, such as views, users, internal users, and the like, as they relate to elements of the source content taxonomy, which include group, product, platform, topic, module, and the like. The Web metrics report of FIG. 7 is capable of showing much greater detail than those based on pages or information in Web logs.

As will be appreciated by one skilled in the art, the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

FIG. 8 is a flowchart illustrating operation of a system for integration of Web information architecture taxonomy and Web metrics taxonomy in accordance with an illustrative embodiment. Operation begins, and the author develops source content using a taxonomy standard, such as DITA, SGML, or DocBooks, for example (block 802). Then, the author may assign unique identifiers to the source content using a content authoring service, for example (block 804).

The content authoring service transforms the source content into Web content containing the identifiers in tags (block 806). The content authoring service may transform the source content into static Web content, or the source content may be the source for a Web application that generates Web content dynamically. The effect is the same as long as a tag with the identifier is embedded into the Web content.

A Web server determines whether a user views an item of Web content (block 808). If a user views an item of Web content, the Web server generates usage data using the tags (block 810) and stores the usage data (block 812). Thereafter, or if the Web server determines that a user does not view an item of Web content in block 808, a Web metrics report service determines whether to generate a Web metrics report (block 814). The Web metrics report service may generate Web metrics reports periodically by a schedule or on demand, for example. If the Web metrics report service determines that a Web metrics report is to be generated, the Web metrics report service generates a Web metrics report (block 816).

Thereafter, or if the Web metrics report determines that a Web metrics report is not to be generated, the system determines whether an exit condition exists (block 818). An exit condition may exist when the Web server no longer provides the Web content, when the Web metrics report service shuts down, or the like. If an exit condition does not exist, operation returns to block 808 to determine whether a user views an item of Web content. If an exit condition exists in block 818, operation ends.

FIG. 9 is a flowchart illustrating operation of a system for integration of Web information architecture taxonomy and Web metrics taxonomy with automated classification assistance in accordance with an illustrative embodiment. Operation begins when a user defines a source content taxonomy, and the content authoring service analyzes the source content taxonomy (block 902) and identifies recommended identifiers based on the content taxonomy (block 904).

The content authoring service presents the recommended identifiers to the user (block 906). The content authoring service receives user selection of recommended identifiers (block 908) and assigns the selected identifiers to the source content (block 910). With this feedback, the author defining the Web architecture taxonomy may make adjustments to the taxonomy and accept recommended unique identifiers if needed. This act of preprocessing improves the quality of the Web architecture before it is converted into Web content.

Thereafter, the content authoring service generates a prototype usage metrics report (block 912). The content authoring service then receives user modification of the taxonomy and the identifiers (block 914). With this feedback, the author may make adjustments to the taxonomy or assign new unique identifiers if needed. This technique emphasizes the usage metrics taxonomy up-front, making it clear that it is one and the same with the Web architecture taxonomy. Thus, if an author already has defined the taxonomy of the Web architecture, the author may have different ideas once he sees the taxonomy in the context of the usage metrics report. Using this technique, the author will be less likely to have changes to the taxonomy later after the Web content is created. Thereafter, operation ends.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, the illustrative embodiments provide mechanisms for integration of Web information architecture taxonomy and Web metrics taxonomy. When the author creates source content, the mechanism classifies the content using a rich taxonomy. The mechanism also adds unique identifiers into the source content pages as tags. The mechanism may then transform the source content into Web content that contains the identifiers in the tags. When users view the Web content, the tags generate usage data, which contain the identifiers. A Web metrics mechanism generates a Web metrics report from the usage data. According to the illustrative embodiments, the page tags are the identifiers from the source content. That is, the page tag data may be mapped back to the source content taxonomy. The effect is a Web metrics report that associates each page of Web content with the rich taxonomy available in the source content.

The solution of the illustrative embodiments provide Web metrics reports with much greater detail than those based on pages or information in Web logs. The complex schema defined in the source content taxonomy can be combined with the Web log data and other data to create more detailed reports. The solution of the illustrative embodiments also saves time, because the Web architecture schema and the Web metrics schema are exactly the same. How content is classified in the Web architecture is immediately represented in how Web metrics are classified in the Web metrics report, because they are one and the same. Another benefit is that the taxonomy can be changed or made more complex with few changes. If additional taxonomy is needed to organize the Web content, it can be added and used in the Web metrics reports without having to change the method of collecting and generating the Web metrics.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for integrating source content taxonomy and Web metrics taxonomy, the method comprising:
   developing source content using a source content taxonomy, using a content authoring service, and using a content architecture standard;
   storing the source content in source content storage;
   assigning one or more unique identifiers to the source content based on the source content taxonomy, wherein assigning one or more unique identifiers to the source content based on the source content taxonomy comprises:
      analyzing the source content taxonomy;
      identifying one or more recommended identifiers based on the source content taxonomy;
      presenting the one or more recommended identifiers to an author;
      receiving selection of at least one identifier from the one or more recommended identifier from the author; and
      assigning the selected at least one identifier to the source content;
   generating Web content, wherein the Web content contains tags having references to the source content;
   inserting the one or more unique identifiers into corresponding tags in the Web content;
   storing the Web content in Web content storage;
   responsive to a user viewing from a Web server a page of Web content containing a given tag having a given unique identifier within the one or more unique identifiers, generating Web usage data recording the viewing of the page of Web content, wherein the given tag contains a reference to given item of content in the source content, wherein the reference to the given item of content comprises a uniform resource locator, and wherein inserting the one or more unique identifiers comprises inserting the given unique identifier into the uniform resource locator referencing the given item of content; and
   generating a Web metrics report based on the Web usage data in the Web metrics taxonomy, wherein the Web metrics report maps the viewing of the page of Web content to the source content taxonomy based on the given unique identifier.

2. The method of claim 1, wherein the given tag uses the given unique identifier as a parameter for a non-visible image file.

3. The method of claim 1, wherein the given tag uses the given unique identifier as a parameter for a non-HTML item of content.

4. The method of claim 1, wherein the given tag uses the given unique identifier as a parameter to a script function.

5. The method of claim 1, wherein assigning one or more unique identifiers to the source content based on the source content taxonomy comprises:
   generating a prototype usage metrics report;
   presenting the prototype usage metrics report to an author; and
   receiving modification of the one or more identifiers from the author.

6. A computer program product comprising a non-transitory computer readable storage medium having a computer readable program stored therein, wherein the computer readable program, when executed on a computing device, causes the computing device to:

develop source content using a source content taxonomy, using a content authoring service, and using a content architecture standard;
store the source content in source content storage;
assign one or more unique identifiers to the source content based on the source content taxonomy, wherein assigning one or more unique identifiers to the source content based on the source content taxonomy comprises:
analyzing the source content taxonomy;
identifying one or more recommended identifiers based on the source content taxonomy;
presenting the one or more recommended identifiers to an author;
receiving selection of at least one identifier from the one or more recommended identifier from the author; and
assigning the selected at least one identifier to the source content;
generate Web content, wherein the Web content contains tags having references to the source content;
insert the one or more unique identifiers into corresponding tags in the Web content;
store the Web content in Web content storage;
responsive to a user viewing from a Web server a page of Web content containing a given tag having a given unique identifier within the one or more unique identifiers, generate Web usage data recording the viewing of the page of Web content, wherein the given tag contains a reference to given item of content in source content, wherein the reference to the given item of content comprises a uniform resource locator, and wherein inserting the one or more unique identifiers comprises inserting the given unique identifier into the uniform resource locator referencing the given item of content; and
generate a Web metrics report based on the Web usage data in the Web metrics taxonomy, wherein the Web metrics report maps the viewing of page of Web content to the source content taxonomy based on the given unique identifier.

7. The computer program product of claim 6, wherein the given tag uses the given unique identifier as a parameter for a non-visible image file.

8. The computer program product of claim 6, wherein the given tag uses the given unique identifier as a parameter for a non-HTML item of content.

9. The computer program product of claim 6, wherein the given tag uses the given unique identifier as a parameter to a script function.

10. The computer program product of claim 6, wherein assigning one or more unique identifiers to the source content based on the source content taxonomy comprises:
generating a prototype usage metrics report;
presenting the prototype usage metrics report to an author; and
receiving modification of the one or more identifiers from the author.

11. An apparatus, comprising:
a processor; and
a memory coupled to the processor, wherein the memory comprises instructions which, when executed by the processor, cause the processor to:
develop source content using a source content taxonomy, using a content authoring service, and using a content architecture standard;
store the source content in source content storage;
assign one or more unique identifiers to the source content based on the source content taxonomy, wherein assigning one or more unique identifiers to the source content based on the source content taxonomy comprises:
analyzing the source content taxonomy;
identifying one or more recommended identifiers based on the source content taxonomy;
presenting the one or more recommended identifiers to an author;
receiving selection of at least one identifier from the one or more recommended identifier from the author; and
assigning the selected at least one identifier to the source content;
generate Web content, wherein the Web content contains tags having references to the source content;
insert the one or more unique identifiers into corresponding tags in the Web content;
store the Web content in Web content storage;
responsive to a user viewing from a Web server a page of Web content containing a given tag having a given unique identifier within the one or more unique identifiers, generate Web usage data recording the viewing of the page of Web content, wherein the given tag contains a reference given item of content in the source content, wherein the reference to the given item of content comprises inserting the given unique identifier into the uniform resource locator referencing the given item of content; and
generate a Web metrics report based on the Web usage data in the Web metrics taxonomy, wherein the Web metrics report maps the viewing of the page of Web content to the source content taxonomy based on the given unique identifier.

12. The apparatus of claim 11, wherein the given tag uses the given unique identifier as a parameter for a non-visible image file.

13. The apparatus of claim 11, wherein the given tag uses the given unique identifier as a parameter for a non-HTML item of content.

14. The apparatus of claim 11, wherein the given tag uses the given unique identifier as a parameter to a script function.

15. The apparatus of claim 11, wherein assigning one or more unique identifiers to the source content based on the source content taxonomy comprises:
generating a prototype usage metrics report;
presenting the prototype usage metrics report to an author; and
receiving modification of the one or more identifiers from the author.

* * * * *